(12) United States Patent
Pierson

(10) Patent No.: US 6,760,996 B1
(45) Date of Patent: Jul. 13, 2004

(54) FISHING LURE

(76) Inventor: Norman C. Pierson, 15 Pleasantview Dr., Erial, NJ (US) 08081

( * ) Notice: Subject to any disclaimer, the term of this patent is extended or adjusted under 35 U.S.C. 154(b) by 91 days.

(21) Appl. No.: 09/922,295

(22) Filed: Aug. 3, 2001

(51) Int. Cl.$^7$ ............................................ A01K 85/00
(52) U.S. Cl. ................................................... 43/42.24
(58) Field of Search ........................... 43/42.24, 42.02

(56) References Cited

U.S. PATENT DOCUMENTS

| | | | |
|---|---|---|---|
| 2,792,662 A | | 5/1957 | Norton |
| 3,147,564 A | | 9/1964 | Messler |
| 3,148,474 A | | 9/1964 | Smith |
| 3,158,952 A | * | 12/1964 | Creme ........................ 43/42.24 |
| 3,349,513 A | * | 10/1967 | Jeff ............................ 43/42.02 |
| 3,449,853 A | | 6/1969 | Shearer |
| D229,933 S | | 1/1974 | Fitzpatrick |
| 3,978,606 A | | 9/1976 | Riggs |
| 3,983,656 A | | 10/1976 | Bain |
| 4,051,619 A | | 10/1977 | McClellan |
| 4,069,610 A | | 1/1978 | Firmin |
| 4,316,343 A | * | 2/1982 | Creme ........................ 43/42.24 |
| 4,653,212 A | * | 3/1987 | Pixton ........................... 43/4.5 |
| D301,730 S | | 6/1989 | Morris |
| 4,856,223 A | | 8/1989 | Evans |
| 4,890,412 A | * | 1/1990 | Tsao et al. ................. 43/42.24 |
| 5,121,567 A | * | 6/1992 | Boone ........................ 43/42.24 |
| 5,136,801 A | | 8/1992 | Pond |
| 5,193,299 A | * | 3/1993 | Correll et al. ............. 43/42.47 |
| 5,517,781 A | | 5/1996 | Paoletta, Jr. |
| 5,894,692 A | * | 4/1999 | Firmin ........................ 43/42.02 |
| 5,934,006 A | * | 8/1999 | Stevenson et al. ......... 43/42.06 |
| 6,138,399 A | * | 10/2000 | Wilson ....................... 43/42.24 |

* cited by examiner

Primary Examiner—Charles T. Jordan
Assistant Examiner—Kimberly S. Smith

(57) ABSTRACT

A fishing lure for providing a simplified lure construction causing movement in the lure that attracts the attention of fish. The fishing lure includes an elongated body having opposite ends, and the body is formed from an elastomeric material such that the body stretches from a relaxed condition into an extended condition upon pulling on the ends of the body in opposite directions and returns to the relaxed condition upon release of pulling on the ends of the body. The body is adapted to contract from the extended condition to the relaxed condition during a finite period of time. In one embodiment of the invention, the body has a substantially linear shape between the ends. In other embodiment of the invention, the body has a substantially spiral shape comprised of a plurality of coils of substantially equal diameter. In still yet another embodiment of the invention, a first portion of the length of the body has a substantially linear shape, and a second portion of the length of the body has a substantially spiral shape comprised of a plurality of coils of substantially equal diameter.

1 Claim, 3 Drawing Sheets

6,760,996 B1

FISHING LURE

BACKGROUND OF THE INVENTION

1. Field of the Invention

The present invention relates to fishing lures and more particularly pertains to a new fishing lure for providing a simplified lure construction causing movement in the lure that attracts the attention of fish.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,051,619; U.S. Pat. No. 3,978,606; U.S. Des. Pat. No. 301,730; U.S. Pat. No. 4,069,610; U.S. Pat. No. 4.856,223; U.S. Pat. No. 5.136.801: U.S. Pat. No. 3,983,656: U.S. Pat. No. 5,517.781; U.S. Pat. No. 2,792,662; U.S. Pat. No. Des. 229,933; U.S. Pat. No. 3,147.564; U.S. Pat. No. 3,148,474; and U.S. Pat. No. 3,449,853.

While these devices fulfill their respective, particular objectives and requirements, the aforementioned patents do not disclose a new fishing lure. The inventive device includes an elongated body having opposite ends, and the body is formed from an elastomeric material such that the body stretches from a relaxed condition into an extended condition upon pulling on the ends of the body in opposite directions and returns to the relaxed condition upon release of pulling on the ends of the body. The body is adapted to contract from the extended condition to the relaxed condition during a finite period of time. In one embodiment of the invention, the body has a substantially linear shape between the ends. In other embodiment of the invention, the body has a substantially spiral shape comprised of a plurality of coils of substantially equal diameter. In still yet another embodiment of the invention, a first portion of the length of the body has a substantially linear shape, and a second portion of the length of the body has a substantially spiral shape comprised of a plurality of coils of substantially equal diameter.

In these respects, the fishing lure according to the present invention substantially departs from the conventional concepts and designs of the prior art, and in so doing provides an apparatus primarily developed for the purpose of providing a simplified lure construction causing movement in the lure that attracts the attention of fish.

SUMMARY OF THE INVENTION

In view of the foregoing disadvantages inherent in the known types of fishing lures now present in the prior art, the present invention provides a new fishing lure construction wherein the same can be utilized for providing a simplified lure construction causing movement in the lure that attracts the attention of fish.

The general purpose of the present invention, which will be described subsequently in greater detail, is to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

To attain this, the present invention generally comprises an elongated body having opposite ends, and the body is formed from an elastomeric material such that the body stretches from a relaxed condition into an extended condition upon pulling on the ends of the body in opposite directions and returns to the relaxed condition upon release of pulling on the ends of the body. The body is adapted to contract from the extended condition to the relaxed condition during a finite period of time. In one embodiment of the invention, the body has a substantially linear shape between the ends. In other embodiment of the invention, the body has a substantially spiral shape comprised of a plurality of coils of substantially equal diameter. In still yet another embodiment of the invention, a first portion of the length of the body has a substantially linear shape, and a second portion of the length of the body has a substantially spiral shape comprised of a plurality of coils of substantially equal diameter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

It is another object of the present invention to provide a new fishing lure that may be easily and efficiently manufactured and marketed.

It is a further object of the present invention to provide a new fishing lure that is of a durable and reliable construction.

An even further object of the present invention is to provide a new fishing lure which is susceptible of a low cost of manufacture with regard to both materials and labor, and which accordingly is then susceptible of low prices of sale to the consuming public, thereby making such fishing lure economically available to the buying public.

Still yet another object of the present invention is to provide a new fishing lure which provides in the apparatuses and methods of the prior art sonic of the advantages thereof, while simultaneously overcoming some of the disadvantages normally associated therewith.

Still another object of the present invention is to provide a new fishing lure for providing a simplified lure construction causing movement in the lure that attracts the attention of fish.

Yet another object of the present invention is to provide a new fishing lure which includes an elongated body having opposite ends, and the body is formed from an elastomeric material such that the body stretches from a relaxed condition into an extended condition upon pulling on the ends of the body in opposite directions and returns to the relaxed condition upon release of pulling on the ends of the body. The body is adapted to contract from the extended condition to the relaxed condition during a finite period of time. In one embodiment of the invention, the body has a substantially linear shape between the ends. In other embodiment of the invention, the body has a substantially spiral shape comprised of a plurality of coils of substantially equal diameter. In still yet another embodiment of the invention, a first portion of the length of the body has a substantially linear shape, and a second portion of the length of the body has a substantially spiral shape comprised of a plurality of coils of substantially equal diameter.

Still yet another object of the present invention is to provide a new fishing lure that contracts slowly causing movement for at least thirty seconds which attracts fish while the present invention is on the bottom of a lake or river.

Even still another object of the present invention is to provide a new fishing lure that is able to attract and capture an increased amount of fish compared to conventional fishing lures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
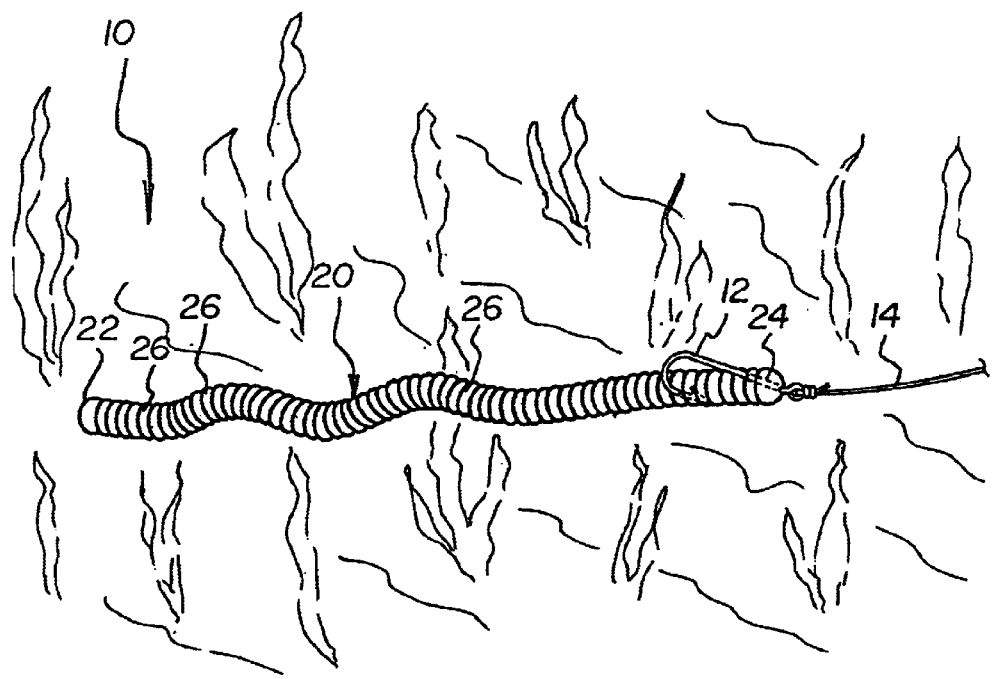
FIG. 1 is a schematic side perspective view of a new fishing lure connected to a conventional fishing hook according to the present invention.
Figure 2:
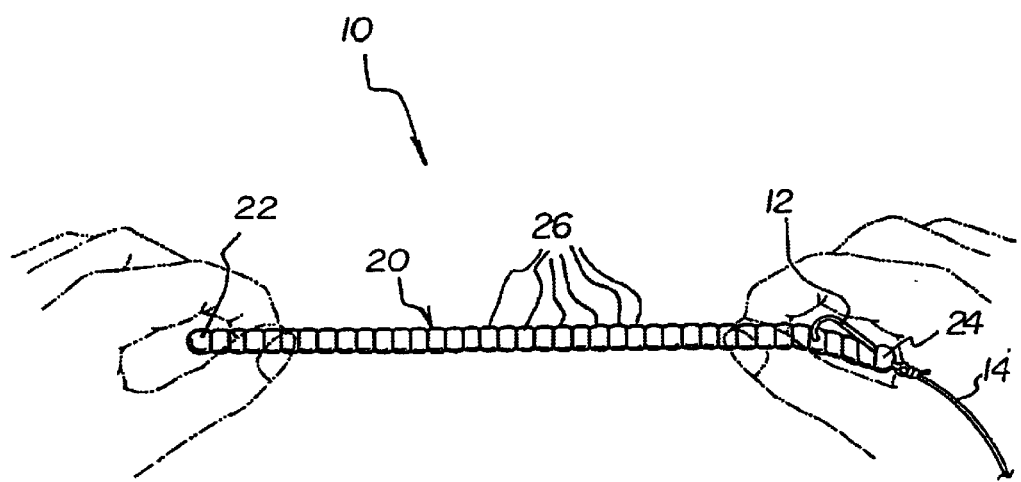
FIG. 2 is a schematic side view thereof disclosing the user engaging the body near each end expanding the rounded partition ribs.
Figure 3:
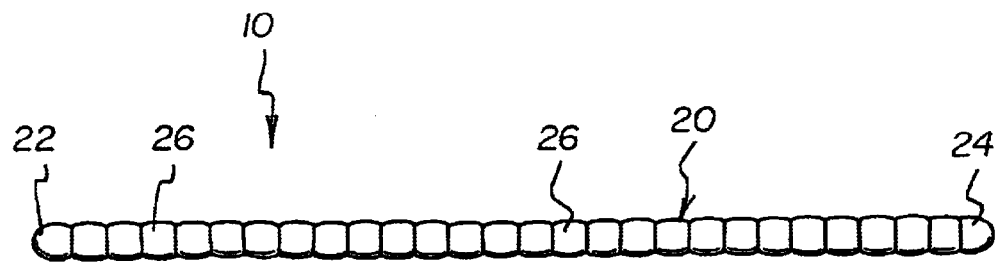
FIG. 3 is a schematic side view of the body in the expanded condition.
Figure 4:
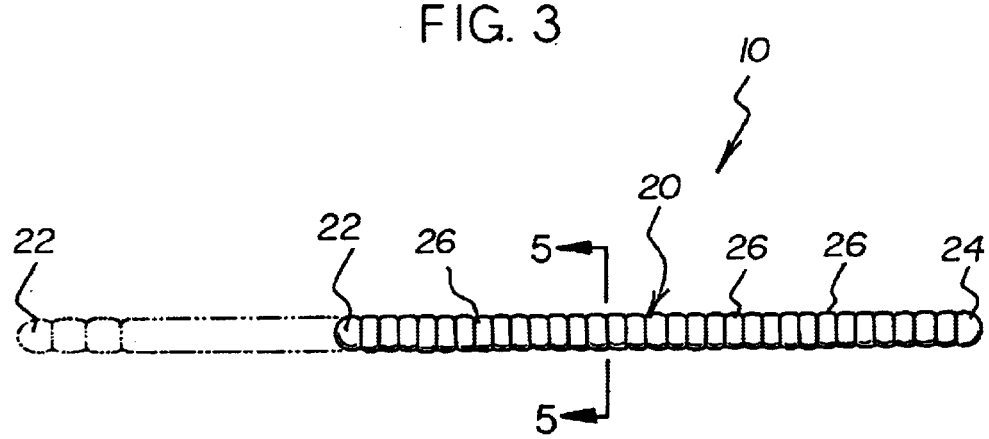
FIG. 4 is a schematic side view of the body in the contracted condition.
Figure 5:
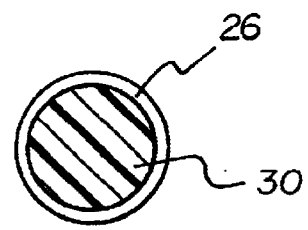
FIG. 5 is a schematic cross sectional view taken along line 5—5 of FIG. 4 disclosing the soft pliable material within the body.
Figure 7:
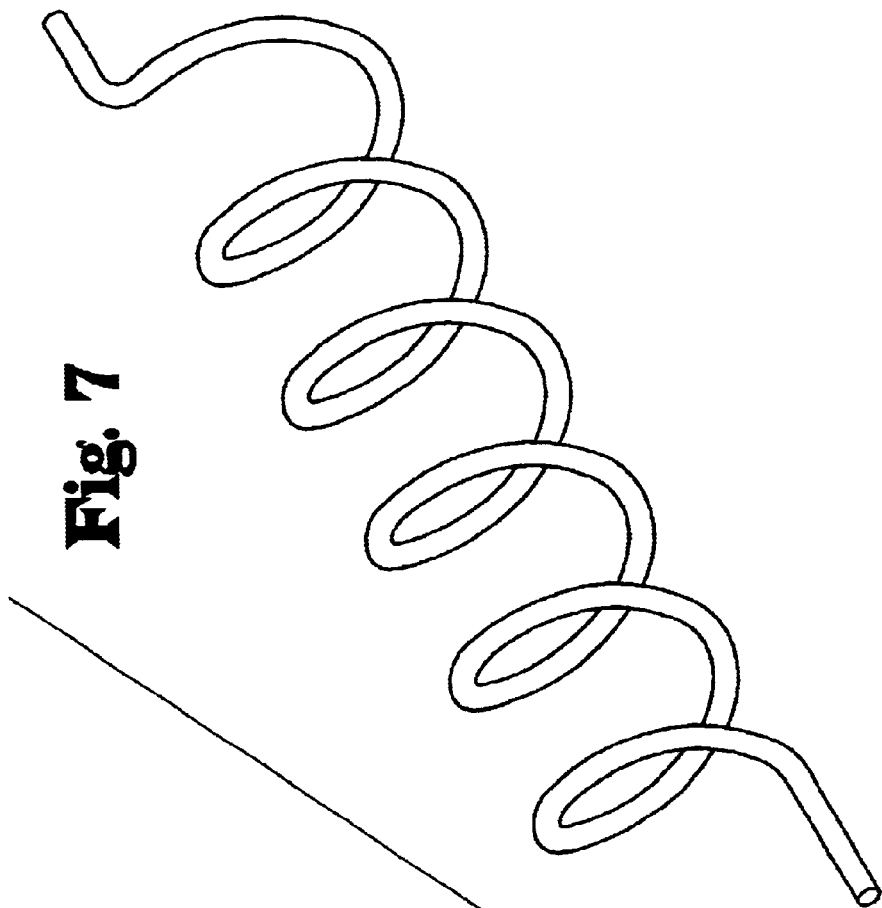
FIG. 7 is a schematic side view of the lure of FIG. 6 shown in an extended condition.
Figure 6:
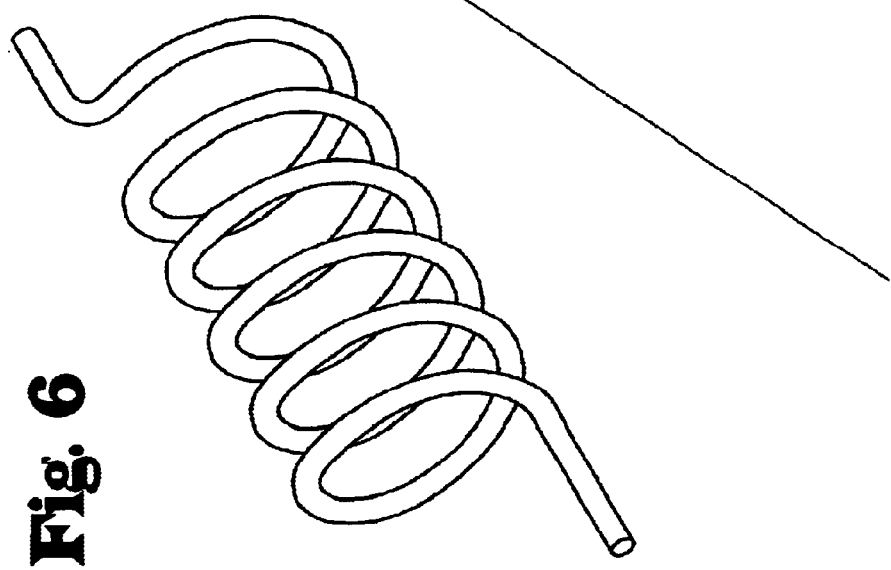
FIG. 6 is a schematic side view of an optional coiled embodiment of the fishing lure according to the present invention shown in a relaxed condition.

With reference now to the drawings, and in particular to FIGS. 1 through 7 thereof, a new fishing lure embodying the principles and concepts of the present invention and generally designated by the reference numeral 10 will be described.

More specifically, it will be noted that the fishing lure 10 comprises an elongated body 20 which can be stretched or extended a substantial length and which independently contracts or recovers its original length over a finite period of time. In one embodiment of the invention, the body contracts from the extended condition to the relaxed condition over a time period not less than 30 seconds, and not greater than 120 seconds. The body 20 includes a head 24 at one end and includes a tail 22 at the end opposite of the head 24. The head 24 and tail 22 may be substantially spherically or spheroidally shaped.

As best illustrated in FIGS. 1 through 5, the body 20 includes a plurality of rounded partition ribs 26 between the head 24 and the tail 22. The body 20 includes a soft pliable member 30 centrally positioned along the longitudinal axis, for thereby increasing the movement during contraction as best disclosed in FIG. 5 of the drawings. The head 24 has an aperture 25 that receives a conventional fishing hook 12 connected to a fishing line 14 whereby the user may cast and retrieve as disclosed in FIG. 1 of the drawings. The length of the body 20 in the expanded position is preferably approximately 10½ inches, but may be approximately 10 inches. The length of the body 20 in the contracted position is preferably approximately 7 inches. The body 20 has a density slightly greater than water thereby preventing high buoyancy so the present invention may rest on the bottom for a period of time.

In one embodiment, the body has a substantially linear shape between the ends. Optionally, the body may have a substantially spiral shape comprised of a plurality of coils of substantially equal diameter (see FIGS. 6 and 7). As a further option, a first portion 32 of the length of the body may have a substantially linear shape, and a second portion 34 of the length of the body may have a substantially spiral shape comprised of a plurality of coils of substantially equal diameter.

In use, the user projects the sharp end of the conventional fishing hook 12 through the head 24. The user then embraces the present invention near the head 24 .and embraces the tail 22, thereby separating said head 24 and tail 22 until the body 20 is taut. The present invention should be approximately 10½ inches in length thereafter, so the user casts the present invention allowing it rest on the bottom of the lake or river. The body 20 thereafter contracts for approximately 30 seconds until it has returned to the contracted position that is preferably approximately 7 inches long. The user then retrieves the fishing lure as he would utilizing a conventional fishing lure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lure assembly comprising:

an elongated body having opposite ends, the body having a length defined along the body between the opposite ends, the body being formed from an elastomeric material such that the body stretches from a relaxed condition with a relatively shorter length into an extended condition with a relatively longer length upon pulling on the ends of the body in opposite directions and returns to the relaxed condition with the relatively shorter length upon release of pulling on the ends of the body, the body being adapted to contract from the relatively longer length of the extended condition to the relatively shorter length of the relaxed condition during a finite period of time;

wherein a first portion of the length of the body has a substantially linear shape, and a second portion of the length of the body has a substantially spiral shape comprised of a plurality of coils of substantially equal diameter;

wherein the body includes a head located at a first one of the ends of the body and a tail located at a second one of the ends of the body, wherein the head and tail of the body are substantially spheroid shaped;

wherein the body includes a plurality of rounded partition ribs located along the body between the ends;

wherein the body includes a pliable member centrally positioned in the body and extending along a length of the body for increasing lateral movement of the body during contraction of the body from the extended position to the relaxed position;

wherein the head of the body has an aperture adapted to receive a fishing hook connected to a fishing line;

wherein a length of the body in the relaxed condition is approximately 7 inches, and the length of the body in the extended condition measures approximately 10 inches;

wherein a material forming the body has a density slightly greater than water such that the body sinks below a surface of a body of water when the body is placed in water; and wherein the body contracts from the extended condition to the relaxed condition over a time period not less than 30 seconds and not greater than 120 seconds.

* * * * *